(12) United States Patent
Berkeman et al.

(10) Patent No.: US 8,099,068 B2
(45) Date of Patent: Jan. 17, 2012

(54) DOWNCONVERSION STRATEGIES FOR REDUCING INTERFERENCE IN WANTED SIGNALS

(75) Inventors: Anders Berkeman, Lund (SE); Shousheng He, Sodra Sandby (SE)

(73) Assignee: Cambridge Silicon Radio Limited, Cambridge (GB)

(*) Notice: Subject to any disclaimer, the term of this patent is extended or adjusted under 35 U.S.C. 154(b) by 378 days.

(21) Appl. No.: 12/470,765

(22) Filed: May 22, 2009

(65) Prior Publication Data
US 2010/0093296 A1  Apr. 15, 2010

Related U.S. Application Data

(63) Continuation of application No. 12/249,561, filed on Oct. 10, 2008, now abandoned.

(51) Int. Cl.
*H04B 1/18* (2006.01)
(52) U.S. Cl. ..................... 455/192.2; 455/311
(58) Field of Classification Search .......... 455/280, 455/284, 285, 293, 296, 302, 307, 311, 318, 455/339, 192.1, 192.2; 375/344
See application file for complete search history.

(56) References Cited

U.S. PATENT DOCUMENTS

| | | | |
|---|---|---|---|
| 2008/0014894 A1* | 1/2008 | Manku et al. | 455/318 |
| 2009/0061809 A1* | 3/2009 | Muhammad et al. | 455/313 |
| 2009/0239489 A1* | 9/2009 | Kaczman et al. | 455/226.1 |
| 2010/0311381 A1* | 12/2010 | Katsube et al. | 455/307 |

OTHER PUBLICATIONS

K. Stadius et al., "An Image-Reject Downconverter with Sideband Selection for Double-Conversion Receiver", Proc. European Solid-State Circuits Conf. (ESSCIRC) 2001, pp. 33-36.

* cited by examiner

*Primary Examiner* — Nguyen Vo
(74) *Attorney, Agent, or Firm* — Fitzpatrick, Cella, Harper & Scinto

(57) ABSTRACT

A receiver for isolating a wanted signal in a received signal, the receiver comprising a downconverter for downconverting the received signal in frequency to produce a downconverted signal, a filter with a passband intended for isolating that part of the spectrum of the downconverted signal that contains the wanted signal and a controller that seeks to avoid or reduce the effect of passband intrusion in the form of a negative frequency representation of an interferer, appearing in the spectrum of the received signal, upconverted in frequency to the passband. The invention consists in corresponding methods also.

13 Claims, 8 Drawing Sheets

DOWNCONVERSION STRATEGIES FOR REDUCING INTERFERENCE IN WANTED SIGNALS

This application is a continuation of U.S. application Ser. No. 12/249,561, filed Oct. 10, 2008.

TECHNICAL FIELD

The present invention relates to schemes for isolating a desired communication signal that appears as part of a greater signal. The invention also relates to methods of determining configurations of signal receiver settings that are likely to be more useful for isolating a wanted communications signals that appears as part of a larger signal. The invention finds application in, for example, the field of mobile telephony.

BACKGROUND

FIG. 1 is a block diagram of a mobile telephone 10 viewed from the perspective of its role as a receiver of information from the network with which it communicates. FIG. 1 shows only certain fundamental elements that are involved in the processing of signals that are received at the telephone 10. As shown in FIG. 1, the telephone 10 comprises an antenna 12, a quadrature downconverter 14, a bandpass filter 16, a demodulator 18 and an information sink 20. The purposes of these elements is well known and therefore will now be only briefly discussed.

Wireless signals acquired by the antenna 12 are supplied to the quadrature downconverter 14. The downconverter 14 shifts the acquired signals down in frequency from the RF (radio frequency) range to the IF (intermediate frequency) range. Hence, the acquired signals are said to be downconverted in frequency. In addition to downconverting the signals from the antenna 12 in frequency, the unit 14 also converts the acquired signals into a quadrature format.

The basic structure of the quadrature downconverter 14 is shown in FIG. 1. The signals that are received through the antenna 12 are supplied in parallel to mixers 22 and 24. The quadrature downconverter 14 also comprises a local oscillator 26, whose output is supplied to mixer 22 and, via 90° phase shifter 28, to mixer 24. The output of mixer 22 provides the in-phase component of the quadrature format downconverted signal 30 and the output of mixer 24 provides the quadrature phase component of the quadrature format downconverted signal.

The quadrature format downconverted signal 30 is then supplied to the bandpass filter (BPF) 16. The bandpass filtered quadrature signal, indicated 32, is then supplied to the demodulator 18. The demodulator 18 recovers an information signal 34 from the bandpass filtered quadrature signal 32 and supplies it to the information sink 20. The demodulator 18 can use various techniques to recover the information signal, as will be apparent to the skilled person. For example, the demodulator 18 could perform Viterbi equalisation on the bandpass filtered quadrature format signal 32. The sink could be, for example, a display screen or a speaker forming part of the telephone 10.

It will be apparent to the skilled person that the telephone 10 will comprise many other elements besides those shown in FIG. 1, for example an amplifier arranged to act on the signal from the antenna 12 before it reaches the quadrature downconverter 14 and an analog to digital converter to act on the bandpass filtered quadrature downconverted signal 32 before it is processed by the demodulator 18. However, these and other elements are not described in this document for the sakes of both brevity and clarity, the description instead concentrating on those elements that are most closely connected to the invention.

The frequency of the output of the local oscillator 26 can be varied to adjust the part of the spectrum of the signal acquired by antenna 12 that is downconverted to lie at the passband of the bandpass filter 16. However, the details of such channel selection schemes will be well known to readers skilled in this art.

Consider now the case where the signal acquired by the antenna 12 contains just a single active channel spanning a band of frequencies centred on an RF frequency $f_1$. Mathematically, the spectrum of the signal acquired by the antenna 12 extending in the positive frequency domain can be regarded as reflected about 0 Hz to the negative frequency domain. FIG. 2 illustrates the spectrum of the signal acquired by the antenna 12 comprising the signal 33 in the active channel centred on frequency $f_1$ and also its "reflection" 35, being a complex-conjugated version of the signal 12 but at frequency $-f_1$.

The complex-conjugation is shown as an asterisk in FIG. 2 (and the same notation is used in those of the subsequent figures that illustrate spectra).

Consider also that the output of the local oscillator 26 is at frequency $\omega$. The effect of the local oscillator signal on the frequency spectrum of FIG. 2 is to convert each component of that frequency spectrum into two components, one shifted down in frequency by $\omega$ (and hereinafter referred to as the "downshifted component") and one shifted up in frequency by $\omega$ (and hereinafter referred to as the "upshifted component"). This is shown in FIG. 3. The quadrature downconverter 14 converts the signal 33 at $f_1$ into a downshifted component 33a lying at $f_1-\omega$ and an upshifted component 33b lying at $f_1+\omega$. Likewise, the quadrature downconverter 14 converts the signal at into a downshifted component 35a lying at $-f_1-\omega$ and an upshifted component 35b lying at $-f_1+\omega$. Thus, each of the signals 33 and 35 at $f_1$ and $-f_1$ is converted into a pair of signals symmetrically disposed about the position of the original signal.

In each of these pairs, the lower frequency signal is regarded as the wanted signal and the other, unwanted, signal is regarded as an image signal (since it is symmetrically disposed beyond the original signal position). Accordingly, the quadrature downconverter 14 is designed to suppress these image signals and this suppression is apparent in FIG. 3 since the upshifted component of each pair is at a much lower power than the downshifted component of the pair. The difference in power of the two components in such a pair is a measure of the image rejection ratio (IRR) of the quadrature downconverter 14. However, in a practical downconverter, the IRR will never be perfect with the result that suppression of upshifted components will never be total. This imperfection in practical downconverters leads to certain problems as will now be discussed with reference to FIG. 4.

FIG. 4 pertains to the case where the spectrum of the signal acquired through antenna 12 contains a signal in a wanted channel, that is to be directed through the passband of the BPF 16, and a signal in a channel adjacent to the wanted channel and having significantly higher power than the wanted channel. FIG. 4 shows three power versus frequency spectra 36, 38 and 40. The frequency axes of these spectra are aligned with one another, for ease of comparison of their frequency content, and the passband of BPF 16 is also shown.

Spectrum 36 shows the spectrum of the signal acquired by the antenna 12. Again, the spectrum of the signal acquired by the antenna 12 can be considered mathematically as containing in the negative frequency region a "reflection" of what is contained in the positive frequency region. The signal in the wanted channel is indicated 42 and its negative frequency "reflection" is indicated 48. The higher power signal in the adjacent channel is indicated 44 and its negative frequency "reflection" is indicated 46.

Spectrum 38 shows, partially, the effect of the downconverter 14 on the positive frequency half of the spectrum 36. The wanted signal 42 is downconverted to yield a downshifted component 42a which lies in the passband of the BPF 16 whereas the higher power adjacent channel signal 44 is downconverted to yield a downshifted component 44a which lies just below the passband. Of course, the downconverter 14 also produces upshifted components for signal 42 and 44 but these components are not shown since they do not bear on the passband (and in any event would lie off the right hand side of the diagram).

Spectrum 40 shows, partially, the effect of the downconverter 14 on the negative frequency half of spectrum 36. The "reflections" 48 and 46 of the wanted and adjacent channel signals (respectively) are downconverted in frequency to yield respective downshifted components and upshifted components. The downshifted components do not bear on the passband and so are not shown (and in any event would lie off the left hand side of the diagram). The upshifted components, however, are shown. The upshifted component 46b of the "reflection" 46 of the adjacent channel signal appears in the passband and the upshifted component 48b of the "reflection" 48 of the wanted signal appears just below the passband. Of course, these upshifted components are suppressed in power to the extent possible given the design of the downconverter 14 (this extent is described by the downconverter's IRR).

It will be apparent that the downconverter 14 operates so as to place both the downconverted component 42a of the wanted signal 42 and the upconverted component 46b of the "reflection" 46 of the adjacent channel signal 44 in the passband of the bandpass filter 16. Accordingly, the upconverted component 46b can hamper the demodulation of the downconverted component 42a in the demodulator 18. It will also be appreciated that this problem will be worse the greater the power of the adjacent channel signal 44.

BRIEF SUMMARY

According to one aspect, the present invention provides a receiver for isolating a wanted signal in a received signal, the receiver comprising a downconverter arranged to downconvert the received signal in frequency to produce a downconverted signal, a filter with a passband intended for isolating that part of the spectrum of the downconverted signal that contains the wanted signal and a controller arranged to control the operation of the downconverter, wherein the controller is arranged to respond to information specifying the location of an interferer in the frequency spectrum of the received signal by setting the frequency downshift that is applied by the downconverter to the received signal to avoid the interferer causing a passband intrusion in the form of a negative frequency representation of the interferer upshifted in frequency to the passband.

The invention also consists in a method for determining a downconverter setting to be employed in a receiver, wherein the downconverter is for downconverting in frequency a received signal acquired by the receiver so that a filter can isolate that part of the spectrum of the downconverted signal that contains a wanted signal and the method comprises obtaining information specifying the location of an interferer in the frequency spectrum of the received signal and responding to said information by setting the downconverter to apply a frequency downshift to the received signal that avoids the interferer causing a passband intrusion in the form of a negative frequency representation of the interferer upshifted in frequency to the passband.

The interferer may, for example, be a dominant interferer in the spectrum of the received signal.

Thus, the invention can avoid using a downconverter setting that might cause an interferer to mask a wanted signal to an unacceptable extent.

According to one aspect, the present invention provides a receiver for isolating a wanted signal in a received signal, the receiver comprising a downconverter arranged to downconvert the received signal in frequency to produce a downconverted signal, a filter with a passband intended for isolating that part of the spectrum of the downconverted signal that contains the wanted signal and a controller arranged to control the operation of the downconverter, wherein the controller is arranged to ascertain whether a frequency downshift that is or can be applied by the downconverter to the received signal causes or would cause a passband intrusion in the form of a negative frequency representation of an interferer, appearing in the spectrum of the received signal, upconverted in frequency to the passband.

Thus, the invention can be used to assess whether a downconversion setting will give rise to a passband intrusion. A passband intrusion can lead to poorer performance in the recovery of information conveyed by the wanted signal.

It can arise that a group of downconversion settings can each give rise to a passband intrusion. Certain embodiments can be arranged, upon encountering these circumstances, to select the downconversion setting from the group that has the least detrimental effect on the recovery of the payload of the wanted signal. It may transpire that this group of passband intrusion causing downconversion settings comprehends all available frequency settings that are usable for downconverting the wanted signal to the passband of the filter.

In certain embodiments, a frequency spectrum is deduced for the received signal and this spectrum is used in the assessment of whether or not passband intrusion occurs. The deduced frequency spectrum can be evaluated for features that will give rise to passband intrusions. The spectrum could be deduced using a fast Fourier transform (FFT) technique or by using a filter bank, for example.

In certain embodiments, use is made of information that is passed to the receiver about other active signals in the vicinity, besides the wanted signal. This information can be used to determine the presence of signals that could give rise to passband intrusions.

The downconversion process that is intended to direct the wanted signal to the passband of the filter may be a single or a multiple stage downconversion. A multiple stage downconversion process uses several mixing steps to provide the desired overall downshift in frequency whereas a single stage downconversion process uses just one mixing step to achieve the desired frequency downshift.

BRIEF DESCRIPTION OF THE DRAWINGS

By way of example only, certain embodiments of the invention will now be described with reference to the accompanying drawings, in which.

DETAILED DESCRIPTION

Figure 4:
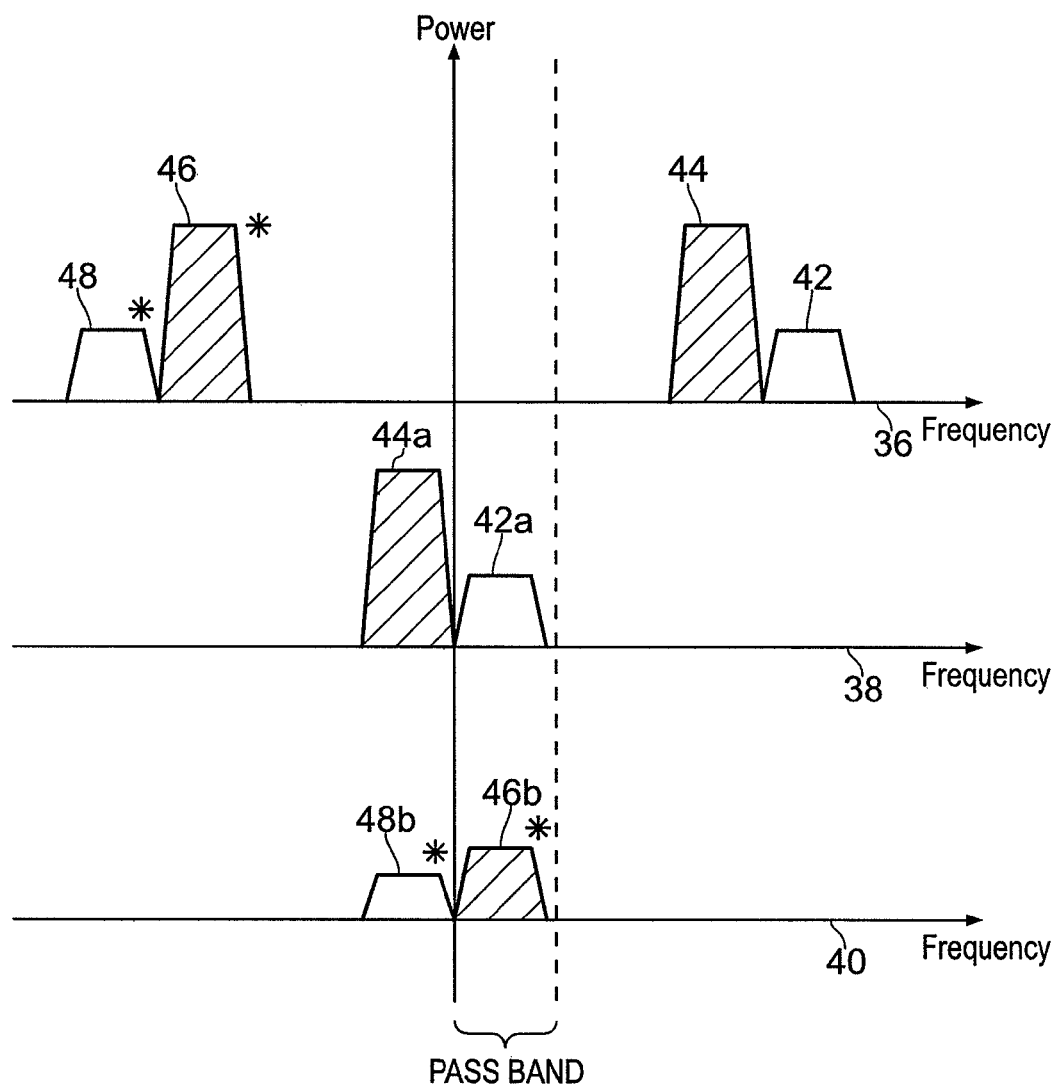
FIG. 4 shows several spectra illustrating a problem that can arise with the downconverter of the mobile telephone of FIG. 1.
Figure 5:
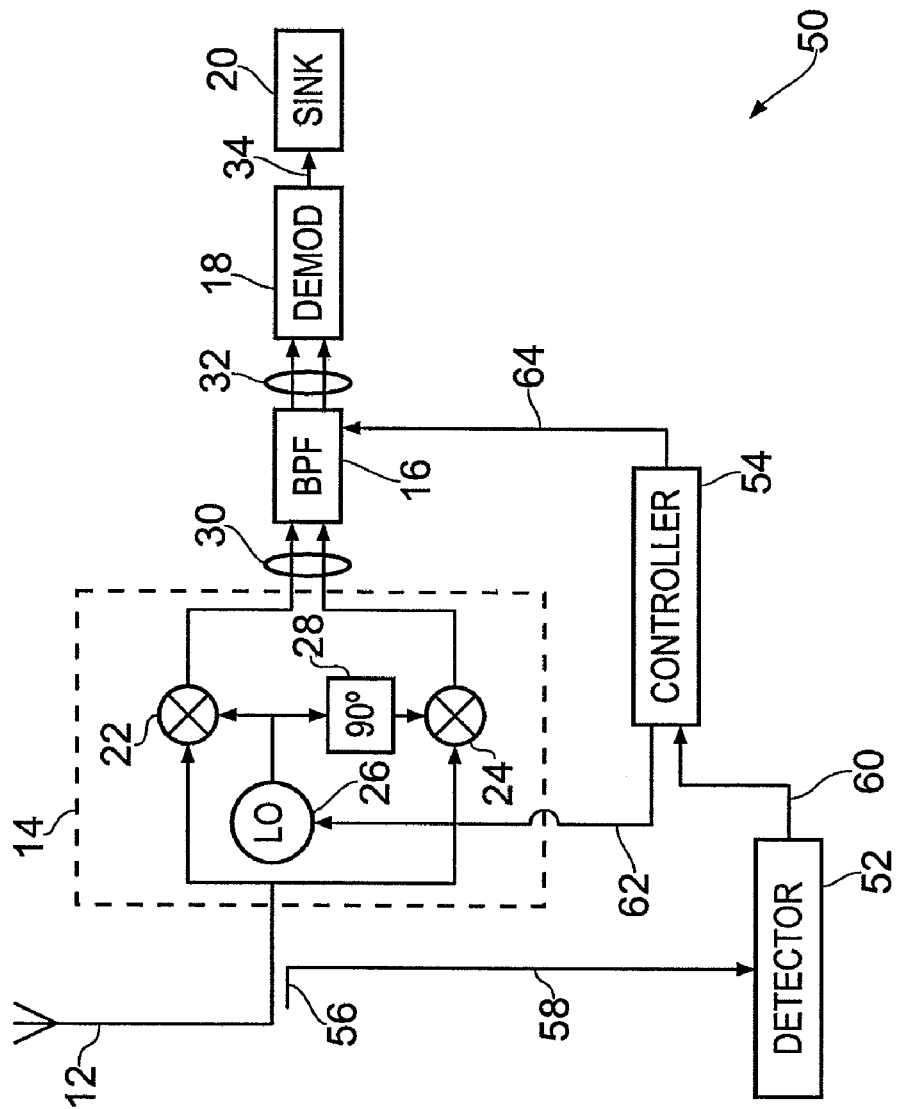
FIG. 5 is a schematic block diagram of a variant of the mobile telephone of FIG. 1.

FIG. 5 shows a mobile telephone 50, which is a version of the mobile telephone 10 of FIG. 1 that has been adapted to address the adjacent channel blocking problem that was discussed with reference to FIG. 4. In FIG. 5, elements of the telephone 10 that have been reused in the telephone 50 retain the same reference numerals and shall not be described again in detail. It is of course to be understood that the telephone 50 will comprise many other elements besides those shown in FIG. 5, which figure concentrates on those elements that are of greatest use in describing the present invention.

Figure 1:
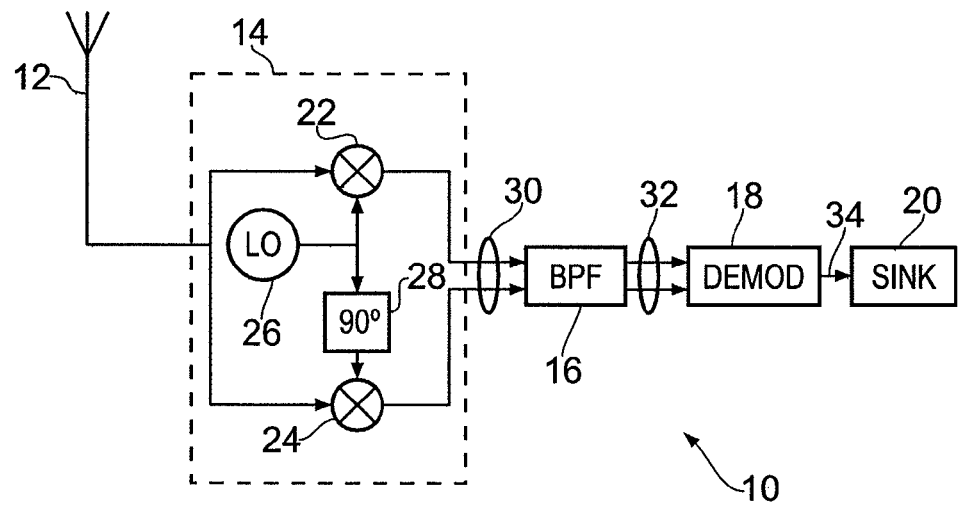
FIG. 1 is a schematic block diagram of a mobile telephone.
Figure 2:
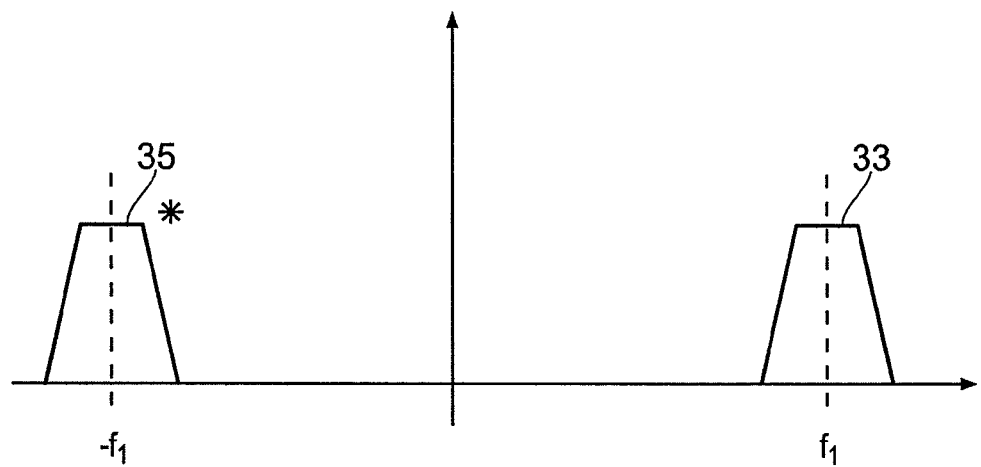
FIG. 2 is a frequency spectrum of a signal entering the downconverter of the mobile telephone of FIG. 1.
Figure 3:
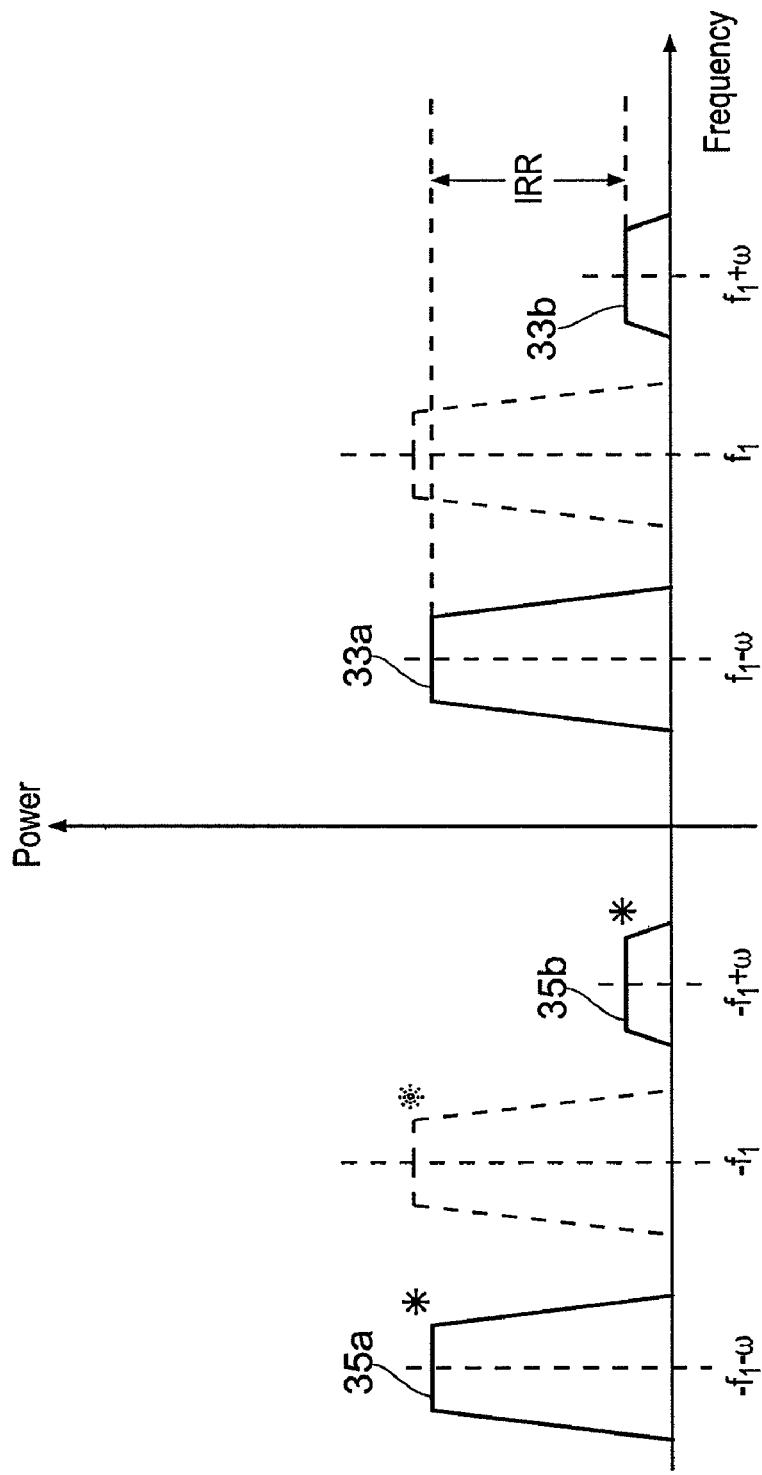
FIG. 3 is a frequency spectrum showing signals resulting from the operation of the downconverter of the telephone of FIG. 1 on the signal shown in FIG. 2.

Above and beyond the elements of FIG. 1, the telephone 50 also includes a spectrum analyser unit 52 and a control unit 54. A coupler 56 is associated with the line between the antenna 12 and the demodulator 14 for providing a fraction of the signal that is acquired through the antenna 12 to the spectrum analyser unit 52 via a signal line 58. The spectrum analyser unit 52 analyses the signal that it receives through line 58 and provides the results of this analysis to the control unit 54 through signal line 60. The nature of the analysis that is performed by the blocker detection unit will be described in detail later in this document. The control unit 54 uses the results of the analysis conducted by the spectrum analyser unit 52 in order to produce control signals that are delivered through signal lines 62 and 64 to the local oscillator 26 and to the bandpass filter 16, respectively. The control signals delivered through line 62 control the frequency of the output signal of the local oscillator 26. The control signals delivered through line 64 control the position of the passband of the BPF 16 in the frequency domain.

The spectrum analyser unit 52 will now be described in more detail. The function of the spectrum analyser 52 unit is to produce a frequency spectrum of the fraction of the signal that is acquired by the antenna 12 that is diverted by coupler 56 to the spectrum analyser unit 52. The spectrum analyser unit 52 provides the control unit 54 over line 60 with a spectrum in the form of a series of frequency bins with a detected signal power value for each bin. The spectrum analyser unit 52 comprises filter bank composed of a plurality of filters, each filter having a passband matching a different one of the frequency bins of the spectrum, and the output of each filter being supplied to a respective power detector in order to produce the power values for the bins.

The operation of the control unit 54 will now be described in more detail. The function of the control unit 54 is to adjust the frequency of the output of the local oscillator 26 and the position of the passband of the BPF 16 such that the wanted signal, as downshifted to the passband, is overshadowed by other signals, hereinafter referred to as "blockers", to the least extent possible. Having regard to the frequency that is set for the output of the local oscillator 26, the control unit 54 evaluates the spectrum provided over signal line 60 to determine whether or not a blocker exists whose negative frequency "reflection" would be upshifted to the passband. If such a blocker exists, the control unit 54 attempts to adjust the frequency of the output of the local oscillator 26 and the position of the passband of the BPF 16 such that the wanted signal is not accompanied by a blocker in the passband. However, if it transpires that at all possible settings of the frequency of the local oscillator 26, the passband of the BPF 16 would be affected by a blocker, then the control unit 54 is arranged to select the pair of local oscillator frequency and passband settings that would lead to the lowest level of blocker interference of the wanted signal in the passband. The operation of the control unit 54 will now be described in more detail with reference to the flow chart in FIG. 6.

Figure 6:
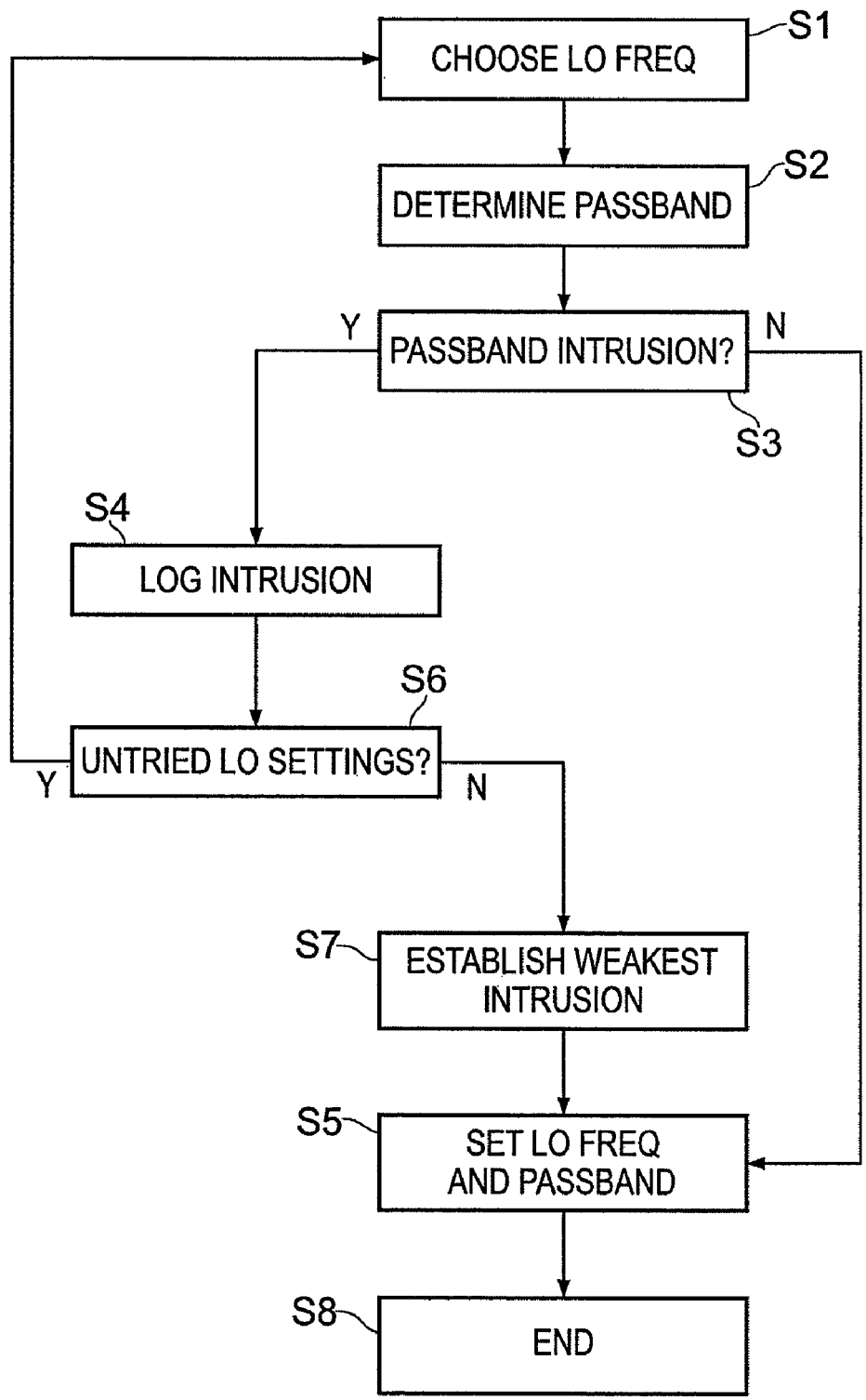
FIG. 6 is a flowchart of a process performed by the controller within the mobile telephone of FIG. 5 in order to avoid interference affecting the demodulation of a wanted signal.

FIG. 6 assumes that the frequency of the local oscillator 26 can assume only a number of discrete values, which hereinafter shall be referred to as the settings of the local oscillator 26. Since the purpose of the BPF 16 is to provide just the wanted signal to the demodulator 18, it will be apparent that the passband of the BPF 16 similarly has a number of settings, each setting corresponding to a respective one of the local oscillator settings. In other words, for each setting of the local oscillator, the passband of the BPF 16 must move to track the position in the frequency domain to which the wanted signal is downconverted.

In step S1 of FIG. 6, an untried one of the local oscillator settings is selected. Initially, all of the local oscillator settings are untried. From step S1, the process moves to step S2 in which the position of the passband of the BPF 16 is determined. The position of the passband is determined so that it spans the frequency domain position to which the wanted signal would be downconverted if the local oscillator setting chosen in step S1 were to be applied to the local oscillator 26. From step S2 the process moves to step S3.

In step S3, the control unit 54 determines whether the local oscillator setting chosen in step S1 would cause the upshifting into the passband determined in step S2 of a deleterious amount of signal energy from a region in the spectrum supplied by the spectrum analyser unit 52 other than that occupied by the wanted signal. Accordingly, the control unit 54 takes the spectrum provided by the spectrum analyser unit 52 and calculates its negative frequency reflection. Then, the control unit 54 determines the upshifted components that correspond to the bins of the negative frequency part of the spectrum. The frequency positions of these upshifted components is readily determined from the knowledge of the local oscillator setting chosen in step S1. The power levels of these upshifted components are readily determined from knowledge of IRR of the downconverter 14, which is made available to the control unit 54. The control unit 54 then determines whether any of the upshifted components so calculated falls within the passband determined in step S2. The signal power of an upshifted component that is found to fall within this passband is compared with a threshold. If the signal power exceeds the threshold then there is deemed to be a passband intrusion. The signal power value at which this threshold is set will differ from one system design to another and the setting of an appropriate signal power value for this threshold will be apparent to the skilled person having regard to the circumstances in which the system that he or she is designing is to operate.

If a passband intrusion is detected in step S3, then the process moves to step S4. If no passband intrusion is detected in step S3, then the process moves to step S5.

In step S4, details of the passband intrusion detected in step S3 are logged in a memory. Specifically, the signal power value of the intruding upshifted component and the local oscillator setting chosen in step S1 are stored. From step S4, the process proceeds to step S6 in which the control unit 54 determines whether or not there are any local oscillator settings that have not yet been tested for passband intrusion. If at least one untried local oscillator setting is available, then the process moves to step S1 in which an as yet untried local oscillator setting is selected. If in step S6 there are no untried local oscillator settings (such that the intrusion log is complete), then the process moves to step S7.

In step S7, the control unit 54 evaluates the data stored in the intrusion log and selects the local oscillator setting that would give rise to the lowest power intrusion into the passband. From step S7, the process moves to step S5, in which the frequency of local oscillator 26 is set to the local oscillator setting that was selected in step S7 or, if step S3 is exited with a negative result, step S1. The passband of the BPF 16 is then set so as to admit that part of the frequency spectrum to which the wanted signal will be downconverted given the local oscillator setting that has been applied. From step S5, the process moves to step S8 and ends.

The frequency with which the controlled unit 54 runs through the process of FIG. 6 will depend on the operating conditions. Clearly, the more often the process is run, then the less likely it becomes that a blocker will effect the demodulation of the wanted signal. Of course, the more often the process is run, the greater the burden will be on the processing resources that are tasked with performing the process. It will also be apparent that increased loading of processing resources also equates to increased power consumption, which is also undesirable.

Figure 7:
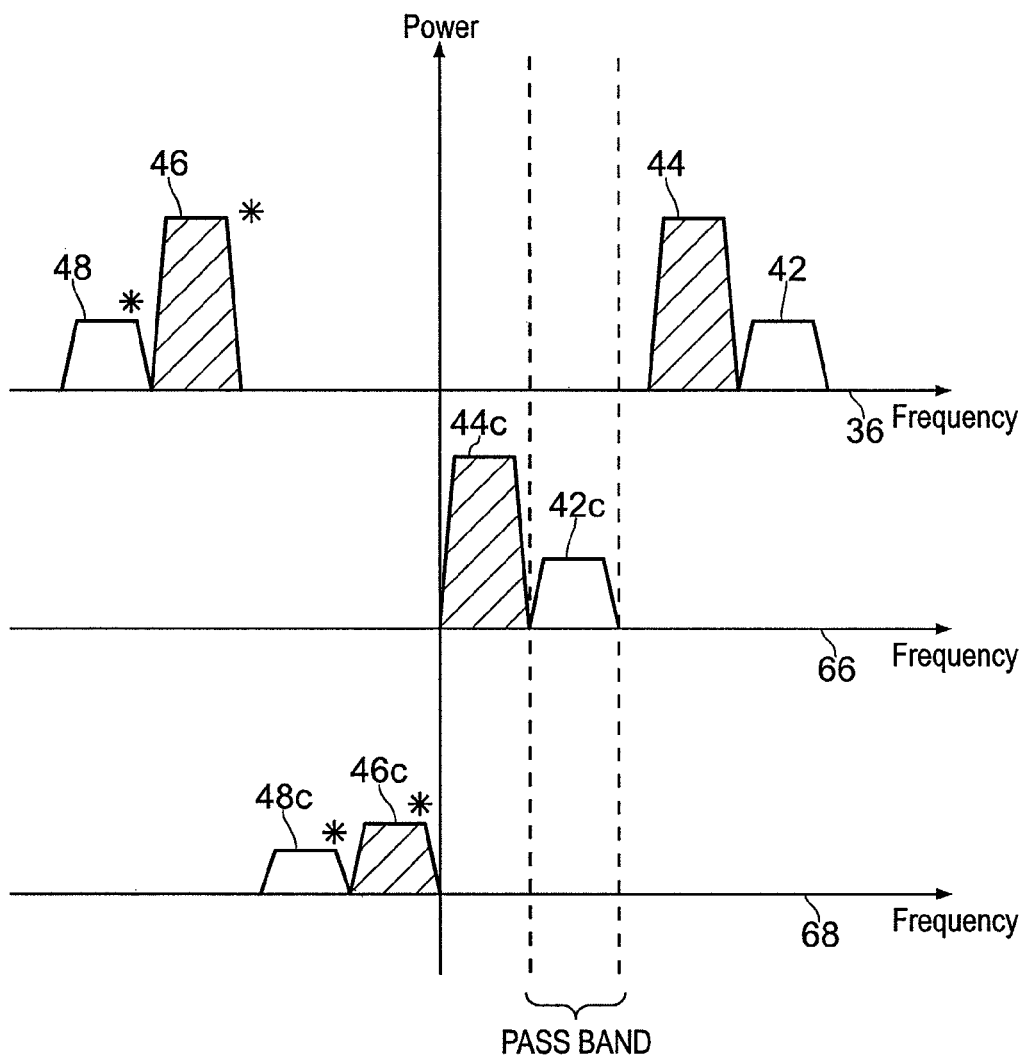
FIG. 7 shows several spectra illustrating how the process outlined in FIG. 6 avoids the problem illustrated in FIG. 4.

An example of the operation of the process of FIG. 6 will now be provided by reference to FIGS. 4 and 7.

It will be apparent to the reader that FIG. 4 amounts to testing whether a particular setting of the local oscillator frequency would result in the intrusion of an upshifted component from the negative frequency region of the spectrum 36 into the passband. It is apparent from FIG. 4 that upshifted component 46*b* arising from "reflection" 46 of adjacent channel signal 44 does indeed intrude on the passband. If signal 46*b* has sufficient power to transgress the threshold used in step S3, then the local oscillator setting to which FIG. 4 pertains will be logged as giving rise to a passband intrusion (in step S4).

Turning now to FIG. 7, the spectrum 36 is reproduced at the top of the diagram. However, FIG. 7 pertains to a different local oscillator setting to FIG. 4 and spectrum 66 shows, partially, the effect that the downconverter 14 would have on the positive frequency half of the spectrum 36 given the new local oscillator setting. The wanted signal 42 is downconverted to yield a downshifted component 42*c* and the higher power adjacent channel signal 44 is downconverted to yield a downshifted component 44*a*. Of course, the downconverter 14 also produces upshifted components for signals 42 and 44 but these components are not shown since, as in FIG. 4, they are beyond the right hand edge of the diagram. Of course, the passband of BPF 16 needs to be adjusted to take into account the new local oscillator setting and the updated passband position is shown in FIG. 7. Spectrum 68 shows, partially, the effect that the downconverter 14 would have on the negative frequency side of spectrum 36. The "reflections" 48 and 46 of the wanted and adjacent channel signals (respectively) are downconverted in frequency to yield respective downshifted components and upshifted components. The downshifted components, as in FIG. 4, fall beyond the left hand edge of the diagram and so are not shown. The upshifted components, however, are shown. The upshifted component of the "reflection" 46 of the adjacent channel signal is indicated 46*c* and the upshifted component of the "reflection" 48 of the wanted signal is indicated 48*c*. The upshifted component 46*c* does not lie within the updated passband so the local oscillator setting to which FIG. 7 pertains does not give rise to a passband intrusion. Accordingly, step S3 of FIG. 6 would be left by the negative path leading directly to S5.

In the system of FIG. 5, the spectrum analyser 52 uses a bank of filters followed by power detectors. Some other possibilities for the assessing the power versus frequency spectrum of the signal acquired by the antenna 12 will now be described.

In a first variant, the spectrum analyser 52 comprises digital signal processing hardware capable of calculating the spectrum of the signal arriving through line 58 using, for example, a fast Fourier transform technique.

In another variant, the spectrum analyser 52 employs a downconverter that mixes a local oscillator signal with the signal arriving through line 58. The resulting signal is then band-pass filtered and supplied to a power detector (typically operating in the digital domain although an analogue version is possible). The frequency of the local oscillator signal may then be swept so that the power detector measures the power spectrum of the signal arriving on line 58.

In a further but similar variant, several downconverters could act in parallel on the signal travelling along line 58, each tuned to direct into the pass-band of a respective filter a relevant adjacent channel frequency band. The outputs of these filters are then subjected to power detection to measure the spectrum at relevant points relative to the wanted channel.

In yet another variant, the quadrature downconverter 14 and the BPF 16 can be used, with appropriate scanning of the frequency of local oscillator 26, to probe the spectrum of the received signal. In such a case, the spectrum analyser unit 52 is redundant although sporadic diversion of the downconverter 14 and the BPF 16, which are of course located in the main signal path, to the task of spectral analysis may result in the disruption of the signal provided to the sink 20.

The embodiments described above use a power versus frequency spectrum to inform the setting of the local oscillator 26 and the passband of the BPF 16. However, it is also envisaged that the control unit 54 could be provided with information about which parts of the frequency spectrum are likely to contain appreciable energy besides the wanted signal. This information could be communicated to the telephone 50 by, for example, the network in which the telephone operates. Such information could be used instead of, or in addition to, the power versus frequency spectrum deduced by the spectrum analyser 52.

An algorithm for avoiding/reducing the intrusion of interferers into the signal processed by demodulator 18 was described with reference to FIG. 6. An alternative algorithm will now be described.

Figure 8:
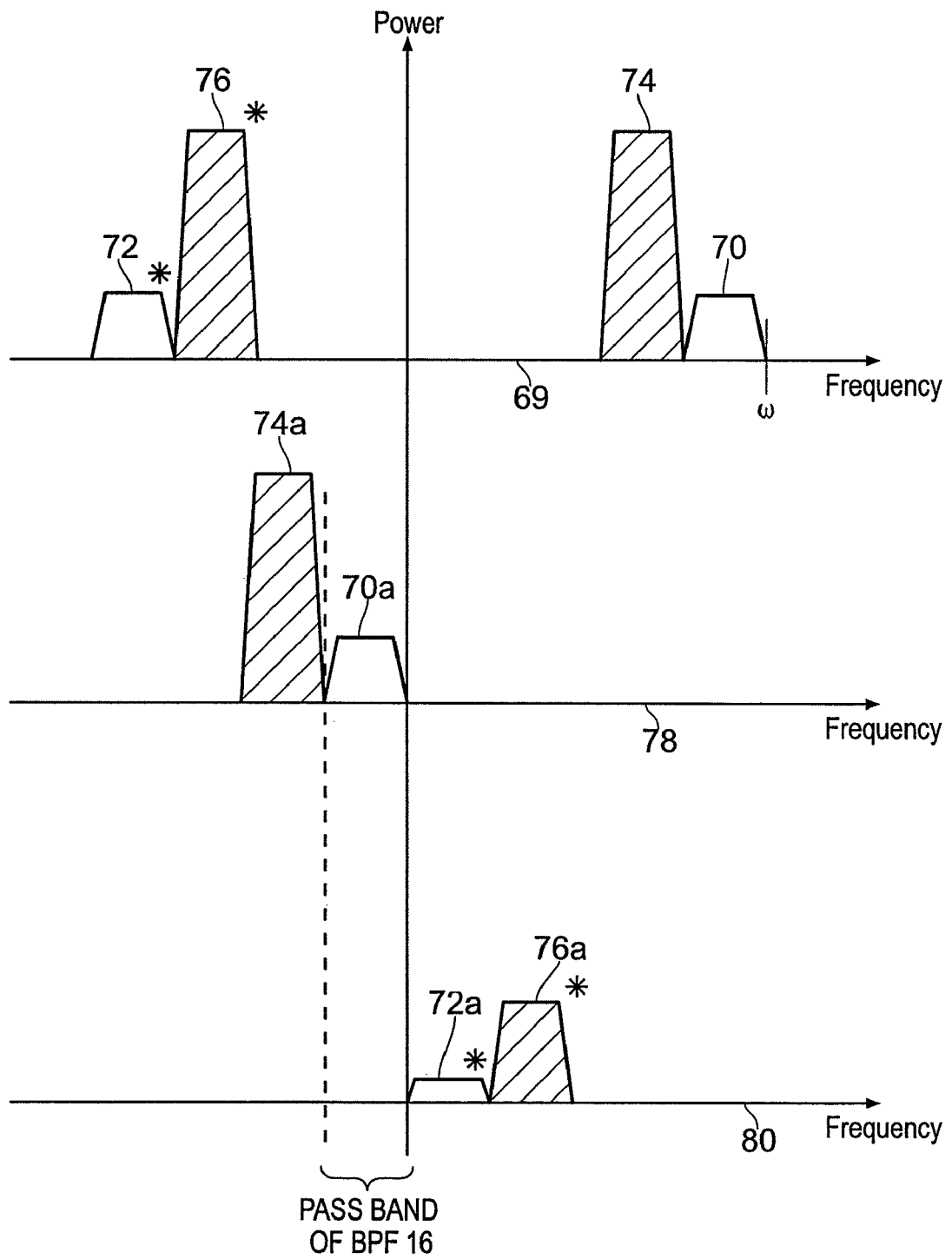
FIG. 8 shows several spectra illustrating a downconversion process that can be performed by the mobile telephone of FIG. 5.
Figure 9:
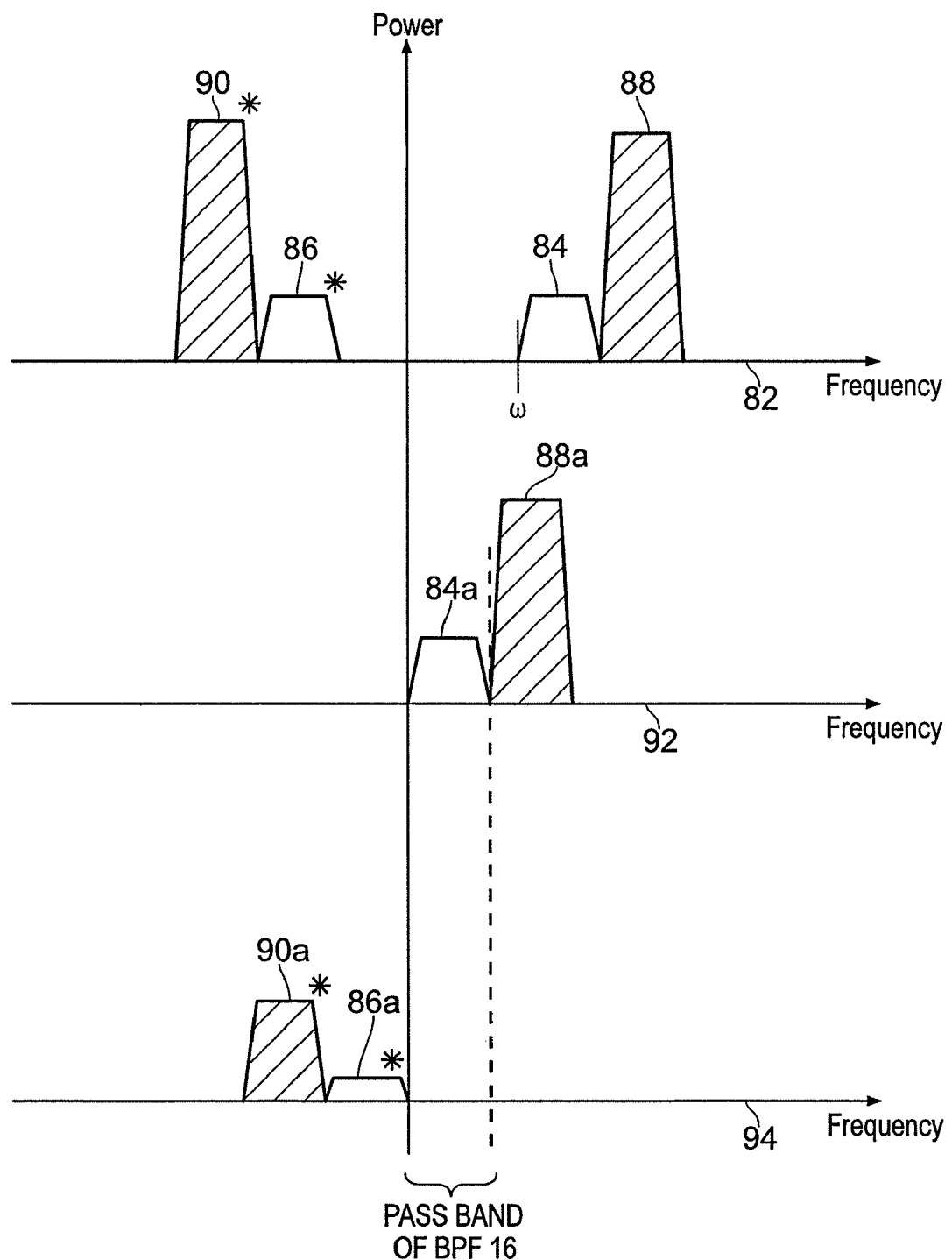
FIG. 9 shows several spectra illustrating another downconversion process that can be performed by the mobile telephone of FIG. 5.

FIGS. 8 and 9 illustrate two different downconversion scenarios, as will now be discussed. These scenarios show a wanted signal and a dominant interferer (shown shaded), and their negative frequency "reflections". The dominant interferer is the highest power interferer in the spectrum, for example as deduced by the controller 54 in assessing the output of the spectrum analyser 52. Each of FIGS. 8 and 9 shows three spectra with the frequency axes (horizontal) aligned for ease of comparison.

Referring now to FIG. 8, spectrum 69 shows the spectrum of the signal acquired by the antenna 12. Again, the spectrum of the signal acquired by the antenna 12 can be considered mathematically as containing in the negative frequency region a "reflection" of what is contained in the positive frequency region. The signal in the wanted channel is indicated 70 and its negative frequency "reflection" is indicated 72. The dominant interferer is indicated 74 and its negative frequency "reflection" is indicated 76. The frequency, ω, of the signal to be applied by the local oscillator 26 in the downconversion process is also shown.

Spectrum 78 shows, partially, the effect of the downconverter 14 on the positive frequency half of the spectrum 69. The wanted signal 70 is downconverted to yield a downshifted component 70a which lies in the appropriately placed passband of the BPF 16 whereas the dominant interferer 74 is downconverted to yield a downshifted component 74a which lies just below the passband. Of course, the downconverter 14 also produces upshifted components for signals 70 and 74 but these components are not shown since they do not bear on the passband (and in any event would lie off the right hand side of the diagram).

Spectrum 80 shows, partially, the effect of the downconverter 14 on the negative frequency half of spectrum 69. The "reflections" 72 and 76 of the wanted signal and the dominant interferer (respectively) are downconverted in frequency to yield respective downshifted components and upshifted components. The downshifted components do not bear on the passband and so are not shown (and in any event would lie off the left hand side of the diagram). The upshifted components, however, are shown. The upshifted components 72a and 76a of the "reflections" 72 and 76 of the wanted signal and the dominant interferer (respectively) appear just above the passband of the BPF 16. Of course, these upshifted components are suppressed in power to the extent possible given the design of the downconverter 14 (this extent is described by the downconverter's IRR).

Spectrum 82 shows the spectrum of the signal acquired by the antenna 12. Again, the spectrum of the signal acquired by the antenna 12 can be considered mathematically as containing in the negative frequency region a "reflection" of what is contained in the positive frequency region. The signal in the wanted channel is indicated 84 and its negative frequency "reflection" is indicated 86. The dominant interferer is indicated 88 and its negative frequency "reflection" is indicated 90. The frequency, ω, of the signal to be applied by the local oscillator 26 in the downconversion process is also shown.

Spectrum 92 shows, partially, the effect of the downconverter 14 on the positive frequency half of the spectrum 82. The wanted signal 84 is downconverted to yield a downshifted component 84a which lies in the appropriately placed passband of the BPF 16 whereas the dominant interferer 88 is downconverted to yield a downshifted component 88a which lies just above the passband. Of course, the downconverter 14 also produces upshifted components for signals 84 and 88 but these components are not shown since they do not bear on the passband (and in any event would lie off the right hand side of the diagram).

Spectrum 94 shows, partially, the effect of the downconverter 14 on the negative frequency half of spectrum 82. The "reflections" 86 and 90 of the wanted signal and the dominant interferer (respectively) are downconverted in frequency to yield respective downshifted components and upshifted components. The downshifted components do not bear on the passband and so are not shown (and in any event would lie off the left hand side of the diagram). The upshifted components, however, are shown. The upshifted components 86a and 90a of the "reflections" 86 and 90 of the wanted signal and the dominant interferer (respectively) appear just below the passband of the BPF 16. Of course, these upshifted components are suppressed in power to the extent possible given the design of the downconverter 14 (this extent is described by the downconverter's IRR).

From FIGS. 8 and 9, two rules can be deduced:
a) if the dominant interferer is in a lower frequency channel than the wanted signal, then the frequency of the local oscillator 26 can be set higher than the frequency of the wanted signal (as in spectrum 69 of FIG. 8), thereby ensuring that the wanted signal is not overlapped by the imperfectly suppressed upshifted version of the negative frequency "reflection" of the dominant interferer.
b) if the dominant interferer is in a higher frequency channel than the wanted signal, then the frequency of the local oscillator 26 can be set lower than the frequency of the wanted signal (as in spectrum 82 of FIG. 9), thereby ensuring that the wanted signal is not overlapped by the imperfectly suppressed upshifted version of the negative frequency "reflection" of the dominant interferer.

The controller 52, having made an assessment of, or having been provided with, the location of the dominant interferer can use these rules to configure the BPF 16 and the downconverter 14 appropriately to ensure that the dominant interferer does not interfere with the wanted signal in the input to the modulator 18.

The invention claimed is:

1. A receiver for isolating a wanted signal in a received signal, the receiver comprising a downconverter arranged to downconvert the received signal in frequency to produce a downconverted signal, a filter with a passband intended for isolating that part of the spectrum of the downconverted signal that contains the wanted signal and a controller arranged to control the operation of the downconverter, wherein the controller is arranged to respond to information specifying the location of an interferer in the frequency spectrum of the received signal by setting the frequency downshift that is applied by the downconverter to the received signal to avoid the interferer causing a passband intrusion in the form of a negative frequency representation of the interferer upshifted in frequency to the passband.

2. A receiver according to claim 1, wherein said interferer is a dominant interferer in the spectrum of the received signal.

3. A receiver according to claim 1, wherein the controller is arranged to set the downconverter to employ, from a plurality of downshifts that have been ascertained as giving rise to passband intrusion, the downshift whose passband intrusion is likely to hamper to the least extent of the recovery of the payload of the wanted signal.

4. A receiver according to claim 1, further comprising an analyser arranged to deduce a frequency spectrum of the received signal for use by the controller in assessing whether passband intrusion occurs.

5. A receiver according to claim 1, wherein the controller is arranged to utilise, in assessing whether passband intrusion occurs, information passed to the receiver about other active signals in the vicinity besides the wanted signal.

6. A mobile telephone comprising a receiver according to claim 1.

7. A receiver for isolating a wanted signal in a received signal, the receiver comprising a downconverter arranged to downconvert the received signal in frequency to produce a downconverted signal, a filter with a passband intended for isolating that part of the spectrum of the downconverted signal that contains the wanted signal and a controller arranged to control the operation of the downconverter, wherein the controller is arranged to ascertain whether a frequency downshift that is or can be applied by the downconverter to the received signal causes or would cause a passband intrusion in the form of a negative frequency representation of an interferer, appearing in the spectrum of the received signal, upconverted in frequency to the passband.

8. A receiver according to claim 7, wherein the controller is arranged to set the downconverter to employ, from a plurality of downshifts that have been ascertained as giving rise to passband intrusion, the downshift whose passband intrusion is likely to hamper to the least extent of the recovery of the payload of the wanted signal.

9. A method for determining a downconverter setting to be employed in a receiver, wherein the downconverter is for downconverting in frequency a received signal acquired by the receiver so that a filter can isolate that part of the spectrum of the downconverted signal that contains a wanted signal and the method comprises obtaining information specifying the location of an interferer in the frequency spectrum of the received signal and responding to said information by setting the downconverter to apply a frequency downshift to the received signal that avoids the interferer causing a passband intrusion in the form of a negative frequency representation of the interferer upshifted in frequency to the passband.

10. A method according to claim 9, wherein said interferer is a dominant interferer in the spectrum of the received signal.

11. A method according to claim 9, wherein the step of setting the downconverter comprises setting the downconverter to employ, from a plurality of downshifts that give rise to passband intrusion, the downshift whose passband intrusion is likely to hamper to the least extent the recovery of the payload of the wanted signal.

12. A method according to claim 9, further comprising deducing a frequency spectrum of the received signal for use in assessing whether passband intrusion occurs.

13. A method according to claim 9, further comprising utilising, in assessing whether passband intrusion occurs, information passed to the receiver about other active signals in the vicinity besides the wanted signal.

* * * * *

UNITED STATES PATENT AND TRADEMARK OFFICE
CERTIFICATE OF CORRECTION

| | | |
|---|---|---|
| PATENT NO. | : 8,099,068 B2 | Page 1 of 1 |
| APPLICATION NO. | : 12/470765 | |
| DATED | : January 17, 2012 | |
| INVENTOR(S) | : Berkeman et al. | |

It is certified that error appears in the above-identified patent and that said Letters Patent is hereby corrected as shown below:

In Column 2, Line 35, delete "at into" and insert -- at $-f_1$ into --, therefor.

Signed and Sealed this
Fourth Day of September, 2012

David J. Kappos
*Director of the United States Patent and Trademark Office*